United States Patent
Diab et al.

(10) Patent No.: US 7,756,267 B2
(45) Date of Patent: Jul. 13, 2010

(54) SYSTEM AND METHOD FOR MIRRORING POWER OVER ETHERNET REGISTERS IN A PHYSICAL LAYER DEVICE OVER A SINGLE ISOLATION BOUNDARY

(75) Inventors: Wael William Diab, San Francisco, CA (US); Nariman Yousefi, Dana Point, CA (US); Scott Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 659 days.

(21) Appl. No.: 11/752,373

(22) Filed: May 23, 2007

(65) Prior Publication Data

US 2008/0294811 A1 Nov. 27, 2008

(51) Int. Cl.
*G06F 1/00* (2006.01)

(52) U.S. Cl. .................. 379/413; 713/300; 370/420
(58) Field of Classification Search .................. 370/359, 370/419, 420; 379/387.01, 395.01, 399.01, 379/413; 713/300
See application file for complete search history.

(56) References Cited

U.S. PATENT DOCUMENTS

2007/0237322 A1 10/2007 Hussain et al.

*Primary Examiner*—Walter F Briney, III
(74) *Attorney, Agent, or Firm*—Duane S. Kobayashi (57) ABSTRACT

A system and method for mirroring power over Ethernet (PoE) registers in physical layer devices (PHYs) over a single isolation boundary. PHYs in a PoE system can be arranged in a master/slave configuration. In this configuration, a master PHY can be designed to communicate with the power source equipment controllers via a single isolation device.

20 Claims, 11 Drawing Sheets

SYSTEM AND METHOD FOR MIRRORING POWER OVER ETHERNET REGISTERS IN A PHYSICAL LAYER DEVICE OVER A SINGLE ISOLATION BOUNDARY

BACKGROUND

1. Field of the Invention

The present invention relates generally to Power over Ethernet (PoE) and, more particularly, to a system and method for mirroring PoE registers in a physical layer device (PHY) over a single isolation boundary. These registers can be the actual PoE registers or a mirrored copy (virtual).

2. Introduction

PoE communication systems provide power and data communications over a common communications link. Specifically, a power source equipment (PSE) device connected to the physical layer of a first node of the communications link provides direct current (DC) power to a powered device (PD) at a second node of the communications link. The DC power is transmitted simultaneously over the same communications medium along with high-speed data.

An important aspect of a PoE device is its management system, which interfaces with the subsystems in the PoE device. One of those subsystems is the PSE subsystem, which includes a PSE controller, as well as the data subsystem that may include but is not limited to a PHY chip, switch chip, or both. The PSE controller performs such functions as discovering a presence of PD devices by checking for characteristic resistances, performing optional classification, managing/integrating power, and monitoring current draw.

The management system is often referred to as the system host. This host includes a local central processor unit (CPU) or simple microcontroller that may run some sort of firmware or software. In some cases, the CPU, PHY and switch may be embedded in one chip while in other larger systems they may be physically located on separate printed circuit boards (PCBs).

A part of the interface between the PHY and a PoE chip is an isolation boundary. A DC isolation boundary is typically formed between the PHY and the PSE controller to limit any effects of DC feedback associated with the DC voltage supply circuit. One of the most common ways of transferring signals across the isolation boundary is to use opto-isolators or opto-coupling devices. The isolation boundary is typically between the PoE subsystem and the rest of the host subsystem that needs to communicate to it. This is due to where the power is fed on the line side of the transformer as compared to the PHY side of the transformer. The isolation boundary is crossed when these subsystems need to communicate with one another. There are several options to connect the PoE subsystem to the rest of the system for communication. The connection may go to the CPU subsystem directly or to the PHY subsystem. If one were to connect each PHY with its associated PSE controller(s) directly, then separate connections would result for each "slice" of ports. These multiple slices would require multiple isolation boundaries. What is needed therefore is a mechanism that enables a single isolation boundary between the PHYs and the PSE controllers. This single isolation boundary would lower the overall system cost and enable the various slices to be treated together (i.e., a vertical look at the PoE, PHY, switch, etc. on a per port basis).

SUMMARY

A system and/or method for mirroring PoE registers in a PHY over a single isolation boundary, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
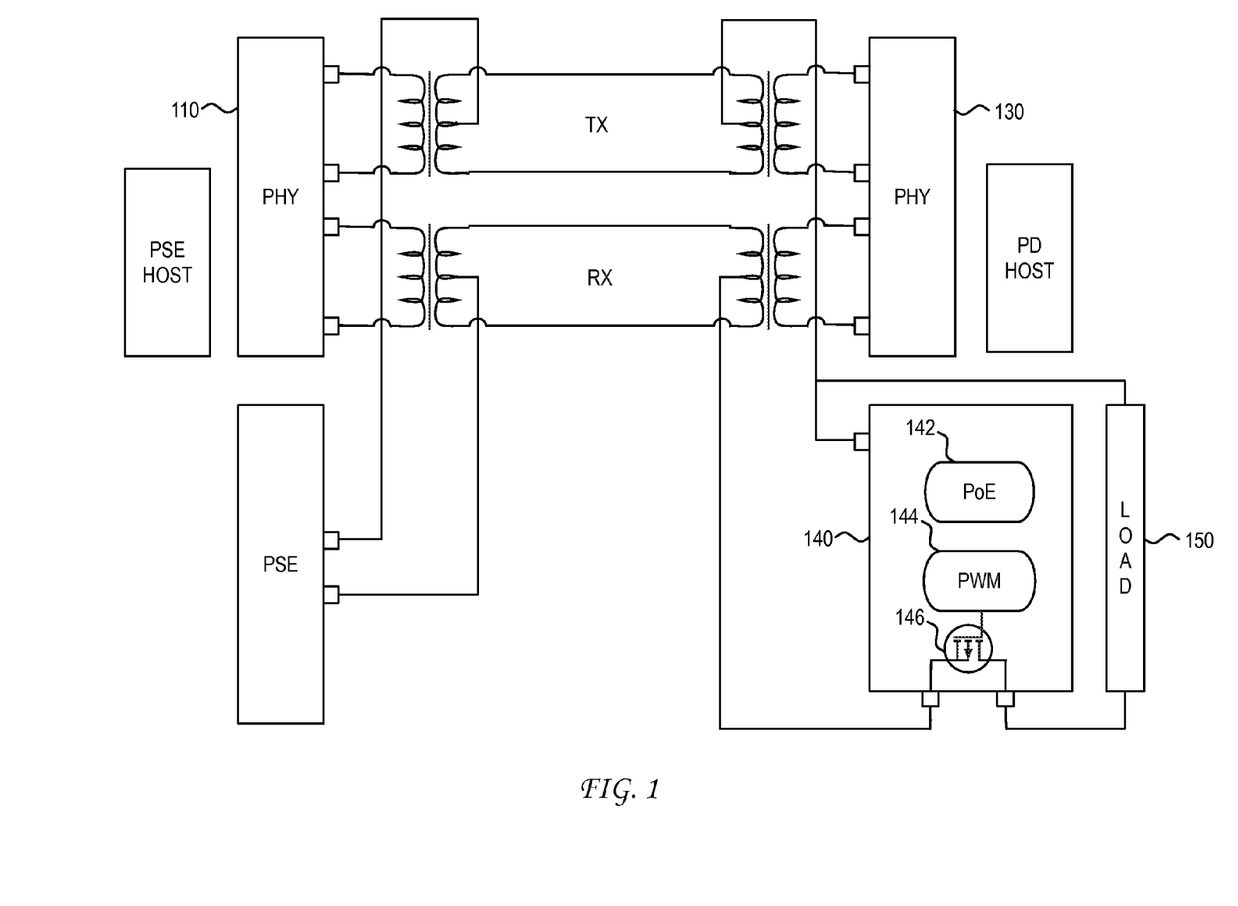
FIG. 1 illustrates an embodiment of a PoE system.

FIG. 1 illustrates an embodiment of a PoE system. As illustrated, the PoE system includes power source equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/ or any other layer 2 PHY technology. As is further illustrated in FIG. 1, PD 140 includes PoE module 142. PoE module 142 includes the electronics that would enable PD 140 to communicate with PSE 120 in accordance with a specification such as 802.3af, 802.3at, legacy PoE transmission, or any other type of PoE transmission. PD 140 also includes pulse width modulation (PWM) DC:DC controller 144 that controls power FET 146, which in turn provides constant power to load 150.

As will be described in greater detail below, an opto-isolator device enables transmission of signals across a DC voltage isolation boundary between PSE 120 and PHY 110. As noted, the isolation boundary is typically between the PoE subsystem and the rest of the host subsystem that needs to communicate to it. This is due to where the power is fed on the line side of the transformer as compared to the PHY side of the transformer. The isolation boundary is crossed when these subsystems need to communicate with one another. There are several options to connect the PoE subsystem to the rest of the system for communication. The connection may go to the CPU subsystem directly or to the PHY subsystem. Communication between a PSE controller and a PHY can occur in various ways. In one embodiment, communication is accomplished using registers that are part of the structure of PSE devices and PHYs.

A PSE controller can include numerous sets of registers. By way of example, a single register can be used within the PSE controller to enable specific ports of the PSE device. Locations within the register, for example, can be used to control the on/off status of ports, determine temperature status, monitor current/voltage, monitor power consumed, activate start classification, perform start detection, etc. The PHY can also include a plurality of registers that are used for a variety of functions. By way of comparison, the number of registers in the PHY is significantly higher than the number of registers within a PSE device.

Controlling operational features of the PHY with PoE is based on the programming of registers in the PHY and within the PSE controllers. Coordination in this programming is important in providing seamless functionality between the PHY and the PSE controller. This process can be further complicated based upon the manner in which information is transferred across the isolation boundary.

It is a feature of the present invention that communication with PSE controllers in a plurality of PSE controller groups can be enabled via a single isolation boundary. This single isolation boundary would lower the overall system cost and enable the various slices to be treated together (i.e., a vertical look at the PoE, PHY, switch, etc. on a per port basis). These and other features of the present invention are described in detail below.

Figure 2:
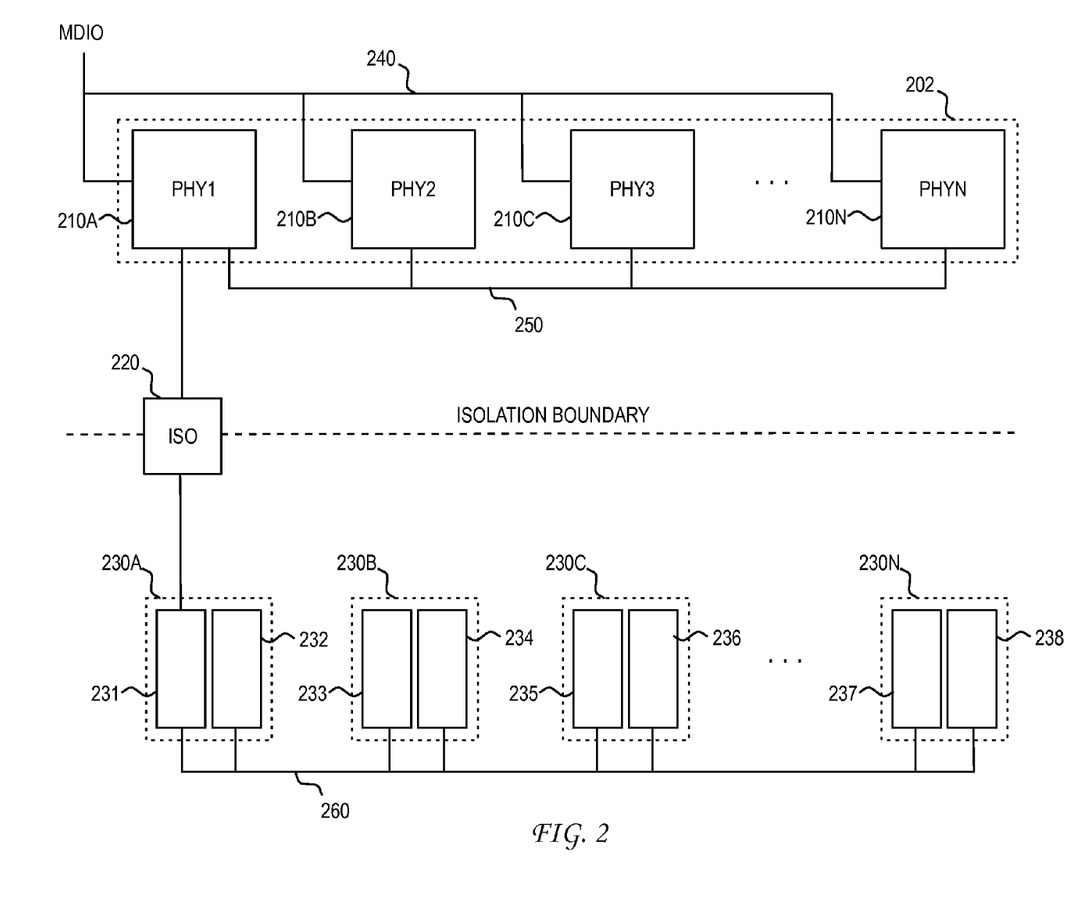
FIG. 2 illustrates an embodiment of PHY and PoE devices in a master/slave configuration.

FIG. 2 illustrates an embodiment of the present invention. As illustrated, a PHY board 202 includes PHYs 210A-210N. PHYs 210A-210N are available in a number of different geometric arrangements. In one example, PHYs 210A-210N are octal PHYs, that support an N×8 configuration. For example, if N=6, then a 6×8 arrangement would yield a total of 48 PHY ports.

PHY board 202 is also coupled to a medium access control (MAC) block (not shown) via an X-type media independent interface (xMII). As would be appreciated, the interface can be implemented as a giga-bit (GMII), serial MIT (SMII), a serial giga-bit MIT (SGMII), a reduced MII (RMII), or similar, interface. The PHYs also include a management data input/output (MDIO) interface 240 to provide management access to the PHY registers.

In the illustration of FIG. 2, PHY board 202 is also coupled to a set of PSE controller groups 230A-230N. PHY board 202 is coupled to the set of PSE controller groups 230A-230N across a single isolation boundary facilitated by isolation device 220. In one embodiment, isolation device 220 is an opto-isolator or opto-coupler. Various interfaces such as serial, differential, I2C, etc. can be used to cross the isolation boundary.

Each PSE controller group 230A-230N corresponds to one of PHYs 210A-210N in PHY board 202. In the example of FIG. 2, each PSE controller group 230A-230N includes two PSE controllers. For example, PSE controller group 230A includes PSE controllers 231 and 232. This configuration can be used, for example, when PHYs 210A-210N are octal-port devices and each PSE controller is a quad-port device. In various scenarios, one or more ports can be used to power a PD.

As illustrated, all PHYs 210A-210N and PSE controller groups 230A-230N are connected to isolation device 220. This feature of the present invention provides significant savings as compared to configurations where multiple isolation devices are used for multiple PHY/PSE pairs (or slices).

To facilitate the use of a single isolation device in the configuration of FIG. 2, PHY 210A is configured as a master device, while PHYs 210B-210N are configured as slave devices. In this configuration, PHY 210A would be responsible for coordinating communication with the various PSE controllers. Prior to describing this functionality, a description of the register space in the PHYs is first provided.

In one embodiment, the registers within PHYs 210A-210N are extended to include additional PoE registers that can be mirrored or replicated within the corresponding PSE controllers. The content of the registers within the PSE controllers is then programmed or mapped as a duplicate or extension of the content of its corresponding PHY. This register mirroring or replication greatly simplifies the PoE programming since it would obviate the need to create separate software drivers for the corresponding PSE controllers.

As noted above, the number of PHY registers greatly exceeds the number of PSE controller registers. Accordingly, the marginal cost of creating additional registers within the PHY is relatively low.

Figure 3:
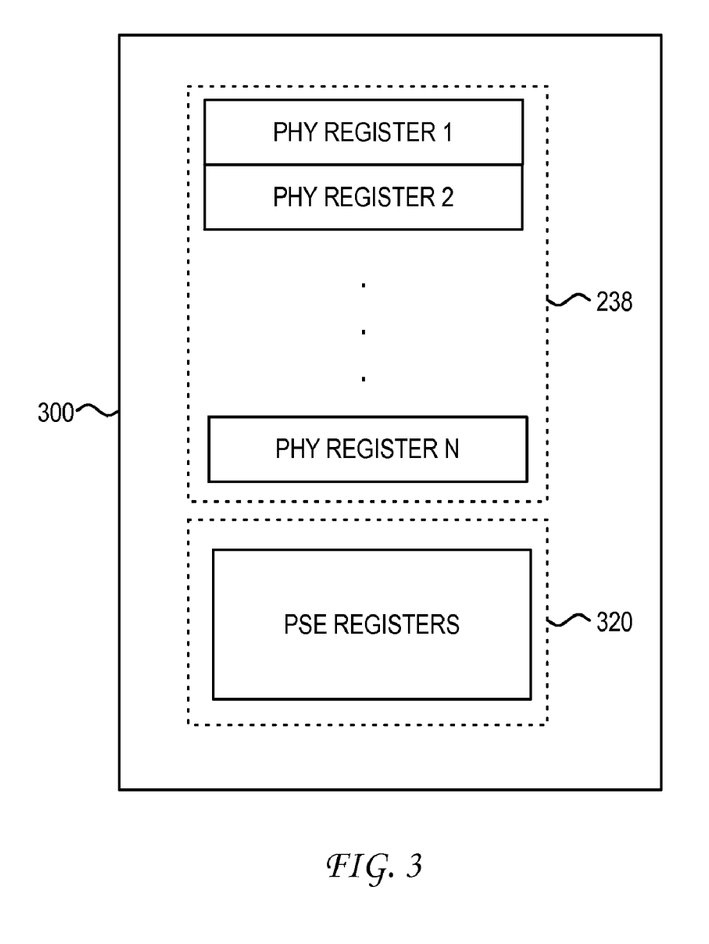
FIG. 3 illustrates an embodiment of an extended register space in a PHY.

FIG. 3 illustrates an embodiment of the register space in a PHY. As illustrated, register space 300 includes PHY register space 310 and an extended PSE register space 320. PHY register space 310 would contain the standard PHY registers 1-N, while extended PSE register space 320 would contain a set of PSE registers for one or more PSE controllers or PSE controller groups. As will be described in greater detail below, the PSE controller registers are mirrored and updated via a hardware interface and protocol that uses a single isolation boundary enabled by isolation device 220.

In the embodiment of FIG. 2, PHY 210A is configured as a master device while PHYs 210B-210N are configured as slave devices. To support the functionality of this master-slave configuration, PHY register spaces such as that illustrated in FIGS. 4A and 4B can be used. Register space 410 in FIG. 4A can be used to support a PHY acting as a master device. As illustrated, register space 410 includes PHY 210A's standard register space 412 as well as extended PSE register space 414. The extended register space 414 contains a duplicate of the registers for all of PSE controller groups 230A-230N. In contrast, register space 420 in FIG. 4B can be used to support a PHY acting as a slave device. In this example, which is applied to PHY 210C, register space 420 includes PHY 210C's standard register space 422. Unlike a PHY operating as a master device, however, the extended register space 424 only contains a duplicate of the registers for a corresponding PSE controller group. For PHY 210C, the corresponding PSE controller group is PSE controller group 230C.

Figure 4A:
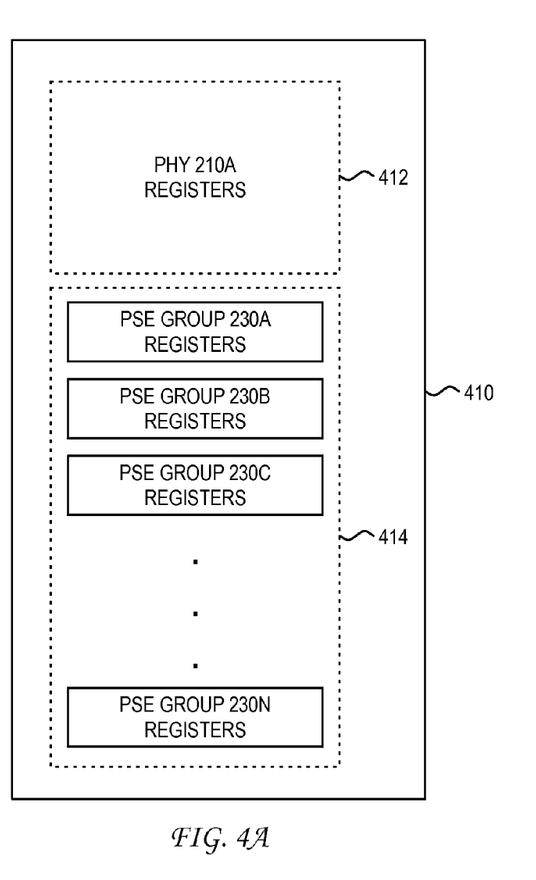
FIGS. 4A and 4B illustrate an embodiment of extended register spaces in master and slave PHYs.
Figure 4B:
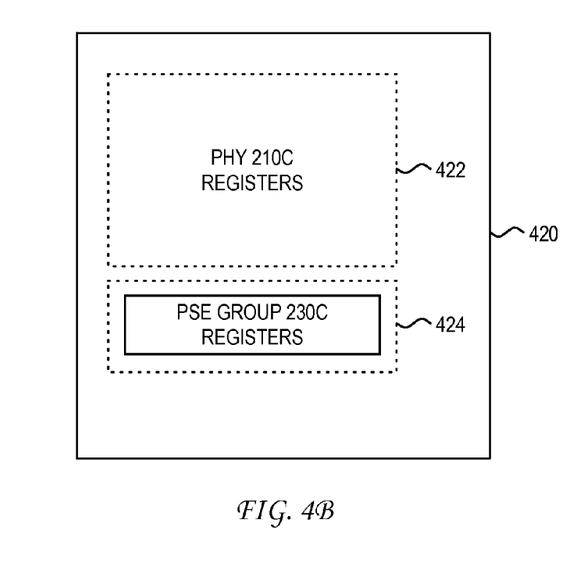
Figure 5A:
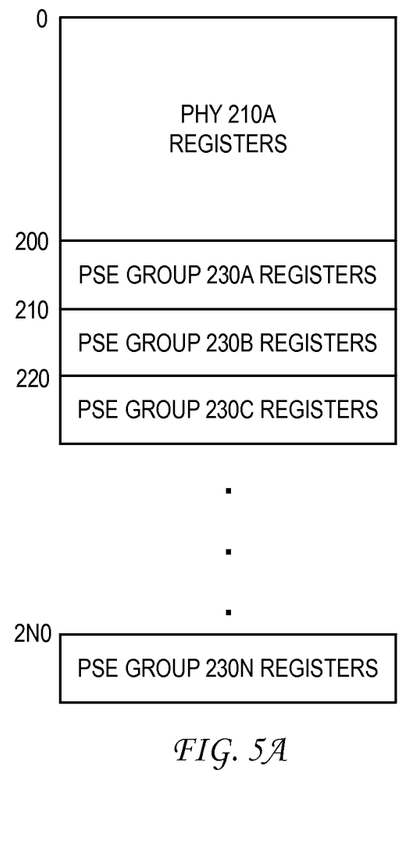
FIGS. 5A-5C illustrate another embodiment of extended register spaces in master and slave PHYs.

In the embodiment of FIGS. 4A and 4B, register spaces 410 and 420 would require different PHY chips. Accordingly, in another embodiment such as that illustrated in FIGS. 5A-5C, master and slave devices are implemented using identical chips. In this embodiment, the register space of master PHY 210A in FIG. 5A is similar to that illustrated in FIG. 4A. Specifically, master PHY 210A stores the PHY data registers for the Ethernet ports supported by PHY 210A. These PHY data registers are stored in the register space shown by addresses 0-199. It should be noted that the specific size of the region of PHY data registers has been chosen simply for illustration purposes. In addition to the PHY data register space, master PHY 210A also stores the PoE registers that are mirrored in each of PSE controller groups 230A-230N. In the illustration of FIG. 5A, the PoE registers for PSE controller group 230A are stored at addresses 200-209 in the extended register space of PHY 210A. Similarly, the PoE registers for PSE controller group 230B are stored at addresses 210-219, the PoE registers for PSE controller group 230C are stored at addresses 220-229, and so forth.

Figure 5B:
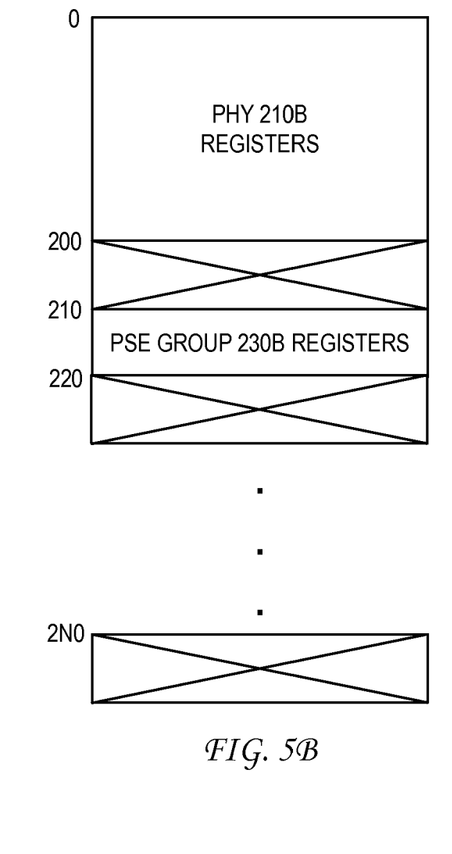
Figure 5C:
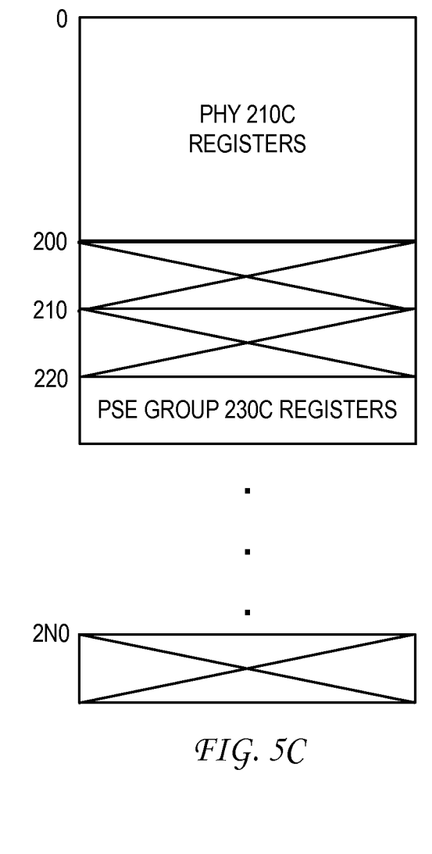

The register spaces for slave PHYs 210B and 210C are illustrated in FIGS. 5B and 5C, respectively. As illustrated in FIGS. 5B and 5C, the register spaces for slave PHYs 210B and 210C only include the PoE registers for their corresponding PSE controller groups. Specifically, slave PHY 210B stores only the PoE registers for its corresponding PSE controller group 230B, while slave PHY 210C stores only the PoE registers for its corresponding PSE controller group 230C. In the illustrated embodiment, the location of storage of a slave PHYs corresponding PoE registers is in common with the storage location at master PHY 210A. Thus, the PoE registers for PSE controller group 230B are stored at addresses 210-219 at both master PHY 210A and slave PHY 210B. As slave PHY 210B does not store the PoE registers for the other PSE controller groups, the register space at addresses 200-209, 220-229, etc. are empty. Only the extended register space at addresses 210-219 is used. In a similar fashion, the extended register space of PHY 210C only stores the PoE registers for PSE controller group 230C at addresses 220-229. The remaining extended register spaces are not used.

Figure 6:
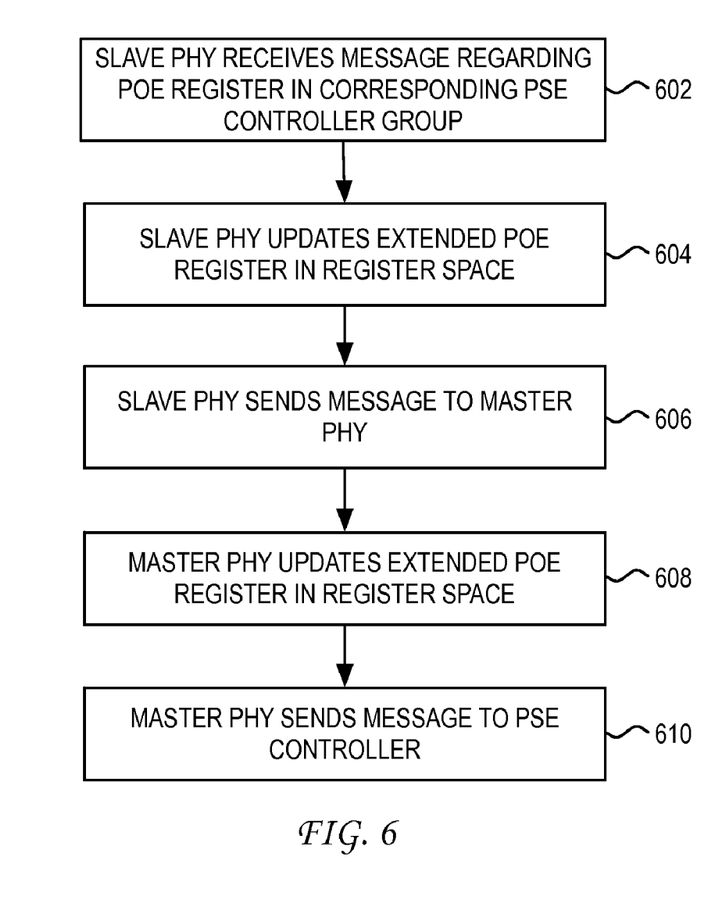
FIG. 6 illustrates a flowchart of a process of messaging to PSE controllers over a single isolation boundary.

To illustrate the operation of a master-slave configuration of PHYs 210A-210N in communicating with PSE controller groups 230A-230N via a single isolation boundary, reference is now made to the flowchart of FIG. 6. This flowchart includes an example process of mirroring a PSE controller register in PSE controller group 230C.

As illustrated, the process begins at step 602 where a slave PHY receives a message regarding a PoE register in a corresponding PSE controller group. This message is received via MDIO bus 240 from a host system and is addressed to the particular slave PHY. For example, assume that the message is being sent to PHY 210C. In this example, the message could relate to a PoE register in either PSE controller 235 or PSE controller 236 in PSE controller group 230C.

After the message is received, at step 604, the slave PHY then updates the PoE register in its extended register space. Where the message relates to a PoE register in either PSE controller 235 or PSE controller 236, PHY 210C would update a register in register space 424 as illustrated in FIG. 4B.

Next, at step 606, the slave PHY would send a message to the master PHY. In one embodiment, this message would be communicated via bus 250, which can be implemented in various forms such as serial, parallel, I2C, etc. In general, bus 250 is a separate interface between the PHYs that enables the slave PHYs to communicate information back to the master PHY. In this process, PoE related messages communicated on bus 250 can be ignored by all of the other slave PHYs. In the current example, a message from slave PHY 210C to master PHY 210A on bus 250 can be ignored by all of the other slave PHYs (i.e., PHYs 210B and 210D-210N).

Upon receipt of the message by master PHY 210A on bus 250, master PHY 210A would then update its own extended PoE register space at step 508. In the illustration of FIG. 4A, this PoE register update would occur in one of the PSE Group 230C registers in extended register space 414. Finally, at step 610, master PHY 210A would send a message to a PSE controller in PSE controller group 230C via isolation device 220.

In one embodiment, messages between master PHY 210A and the PSE controllers in PSE controller groups 210A-210N is via a PSE controller that is configured as a master device. In the illustrated embodiment of FIG. 2, PSE controller 231 in PSE controller group 210A is configured as a master device. In this configuration, the other remaining controllers operate as slave devices and receive communications from master PSE controller 231 via bus 260. In the above example, a message from master PHY 210A would be received by master PSE controller 231, which would then route the message to either PSE controller 235 or PSE controller 236 via bus 260. As would be appreciated, the specific choice of bus design and communication protocol over bus 260 would be implementation dependent.

Figure 7:
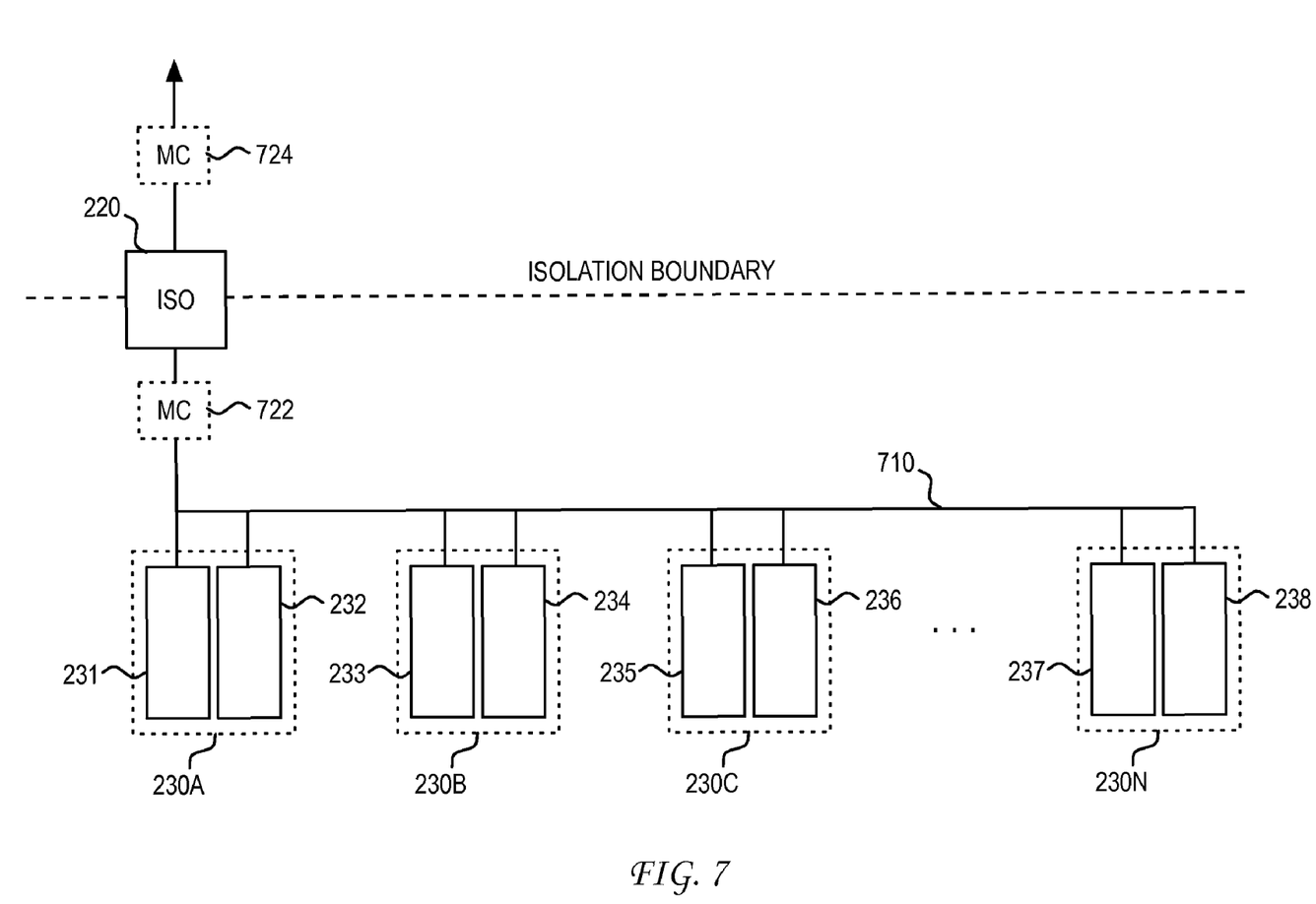
FIG. 7 illustrates an embodiment of PSE controllers in a slave configuration.

In an alternative embodiment, the PSE controllers in PSE controller groups 210A-210N can be configured as slave devices that can be identified based on a physical address. In this configuration, messages from master PHY 210A can be received by individual PSE controllers via bus 710 (see FIG. 7). In one embodiment, messaging to the slave PSE controllers can be facilitated by microcontroller 722, which is positioned below the isolation boundary. In an alternative embodiment, messaging to the slave PSE controllers can be facilitated by microcontroller 724, which is positioned above the isolation boundary. In general, the inclusion of either microcontroller 722 or microcontroller 724 is designed to facilitate communication between a master PHY device and the various slave PSE controllers in PSE controller groups 230A-230N. Again, as would be appreciated, the specific choice of bus design and communication protocol over bus 710 would be implementation dependent.

Figure 8:
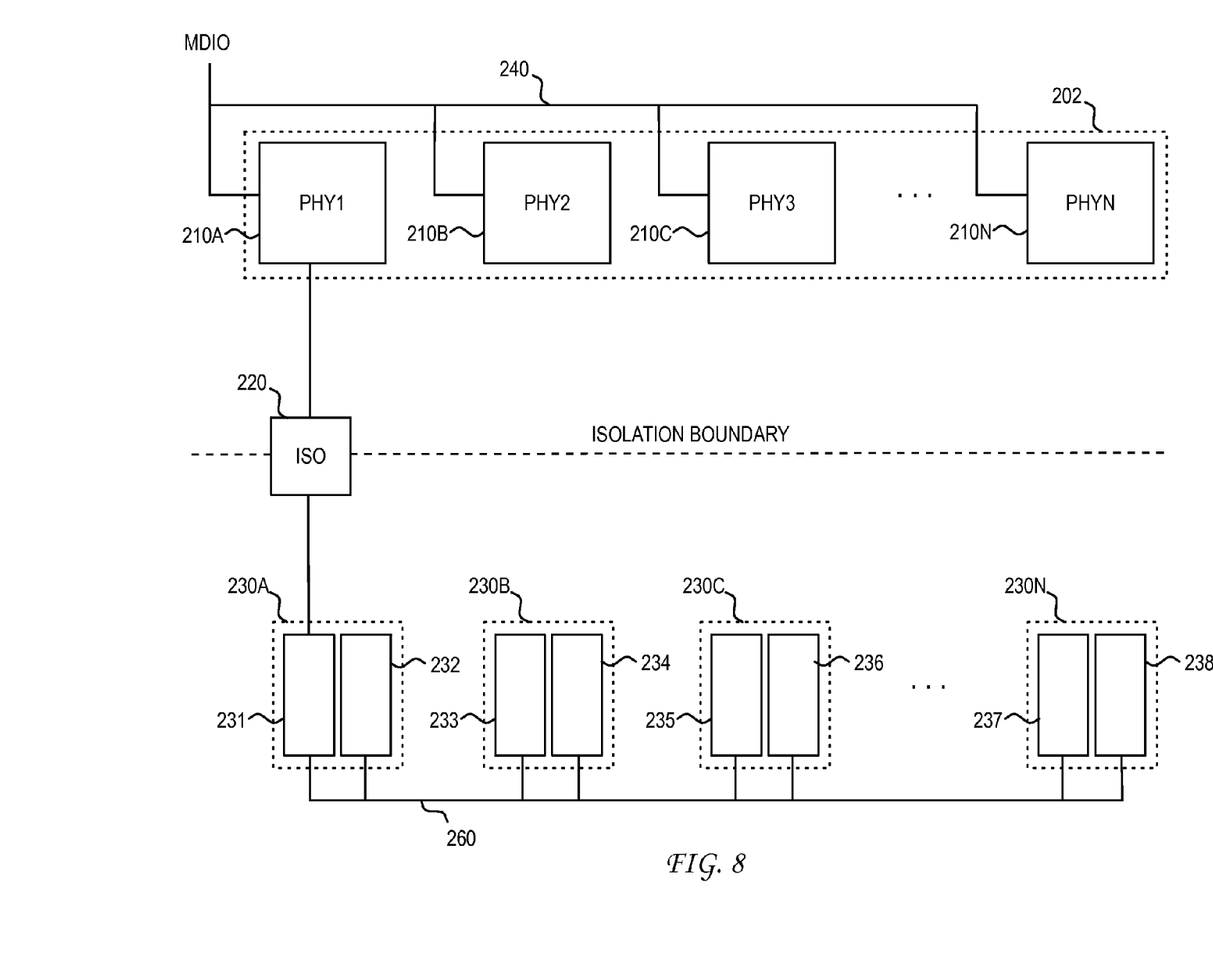
FIG. 8 illustrates a second embodiment of PHY and PoE devices in a master/slave configuration.

As has been described, the embodiment of FIG. 2 enables communication between master PHY 210A and all PSE controller groups 230A-230N via isolation device 220 that provides a single isolation boundary. This greatly simplifies the implementation by reducing the number of isolation devices required. This implementation does come, however, with the expense of an additional bus 250 and increased latency issues through forwarded requests. In an alternative embodiment of the present invention, no special strapping is required to enable PHYs to operate in a PoE slave mode. In this embodiment, which is illustrated in FIG. 8, a separate bus such as bus 250 (see FIG. 2) is not required. To illustrate the messaging process, reference is now made to the flowchart of FIG. 9. In this description, it is assumed that master PHY 210A has a register space such as that illustrated in FIG. 5A.

Figure 9:
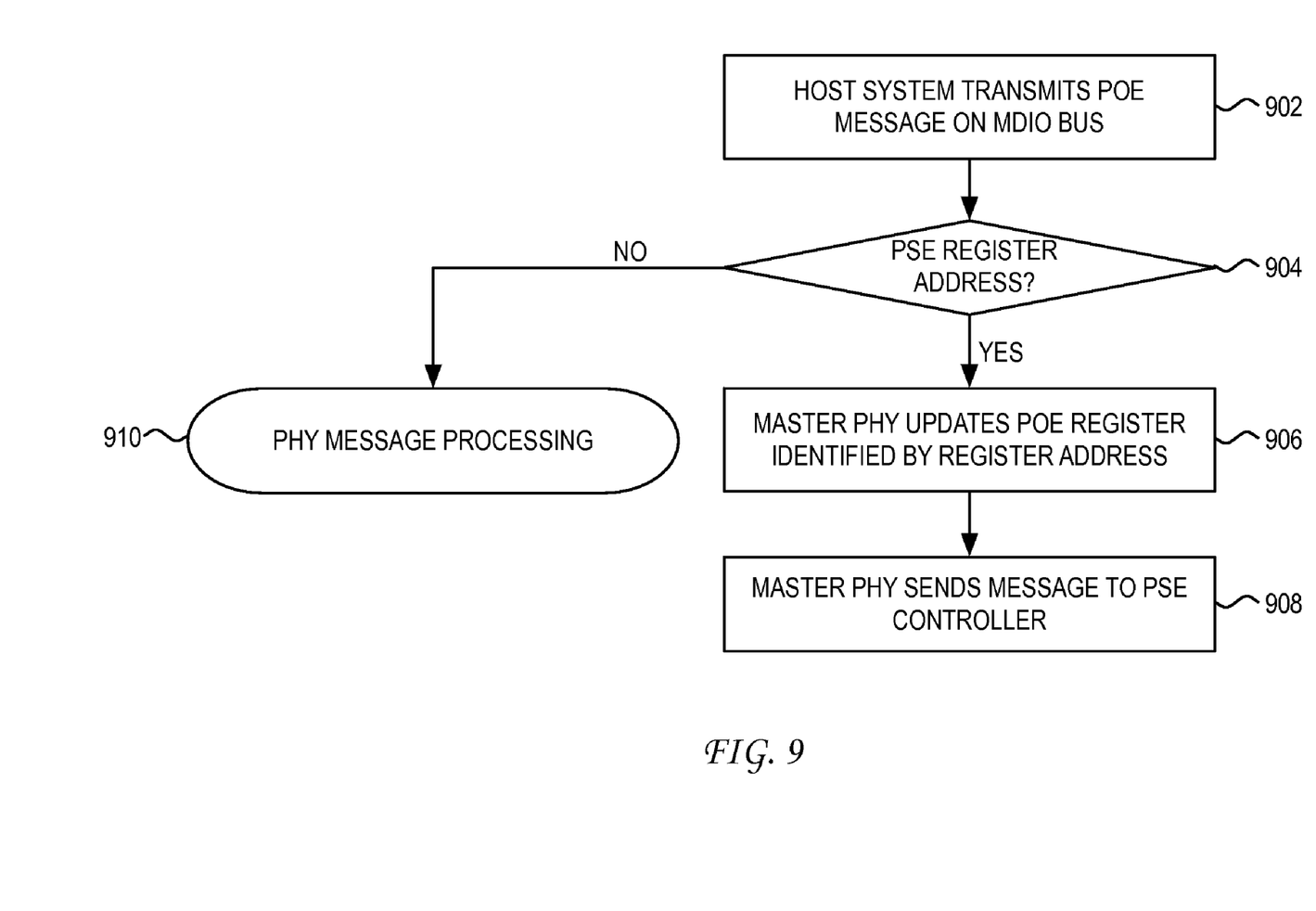
FIG. 9 illustrates a flowchart of another process of messaging to PSE controllers over a single isolation boundary.

As illustrated, the process begins at step 902 where the host system transmits a PoE message on the MDIO bus. Conventionally, the message can include a device address of the PHY along with a register address. This register address can represent an address of a PHY register or for a PoE register that is stored in the extended register space. For example, if the message relates to a PoE register in PSE controller group 230C, then the register address would be in register address space 220-229 (see FIG. 5A).

At step 904, master PHY 210A would perform a determination as to whether the register address in the message represents an address in the extended PSE register space. As would be appreciated, this determination can be performed in combination with a device address check. This device address check is not significant to master PHY 210A, however, because all PoE messages will be handled by master PHY 210A. If it is determined that the register address is a PSE register address, then the process proceeds to step 906 where master PHY 210A updates the PSE register in its extended register space. Next, at step 908, master PHY 210A sends a message to the appropriate PSE controller. This message transmission can be accomplished in any of the various ways described above using a single isolation device.

If, on the other hand, it is determined at step 904 that the register address is not an address in the extended register space, then master PHY 210A would perform conventional MDIO message processing at step 910. Here, master PHY 210A can analyze the device address to determine whether the PHY-related message is directed to PHY 210A. As would be appreciated, slave PHYs 210B-210N would ignore PoE related messages, and determine whether the PHY-related message is directed to themselves.

Figure 10A:
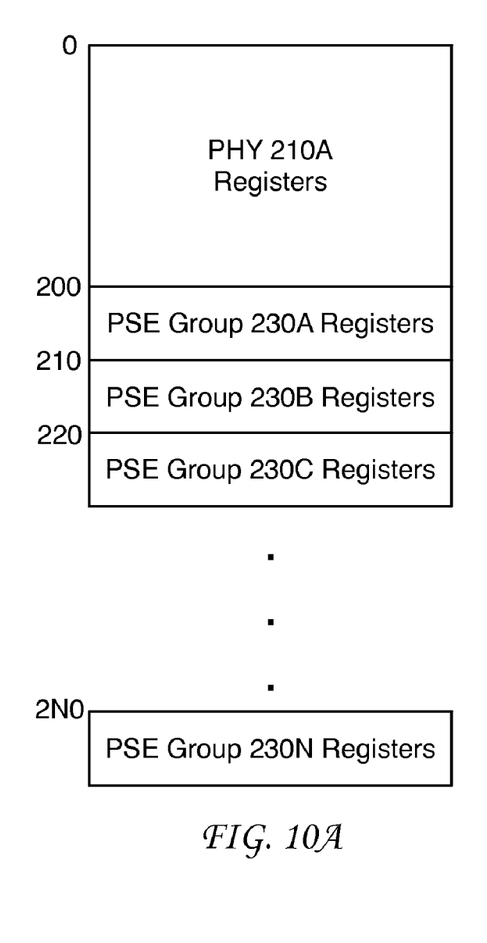
FIGS. 10A, 10B, and 11A-11C illustrate further embodiments of extended register spaces in master and slave PHYs.
Figure 10B:
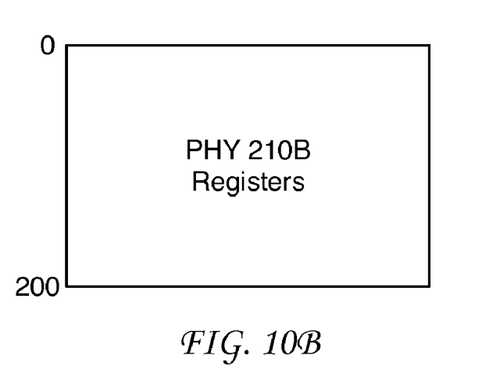

As described in the process of FIG. 9, only master PHY 210A would need an extended PoE register space. Accordingly, in one embodiment, the register spaces of FIGS. 10A and 10B can be used. As illustrated, master PHY 210A includes PHY 210A registers and an extended register space that contains registers for PSE groups 230A-230N. The register space of a slave PHY (such as PHY 210B), on the other hand, would only contain the registers for PHY 210B. No extended register space would be needed. In this embodiment, the register spaces for the master and slave PHYs would require different chips.

Figure 11A:
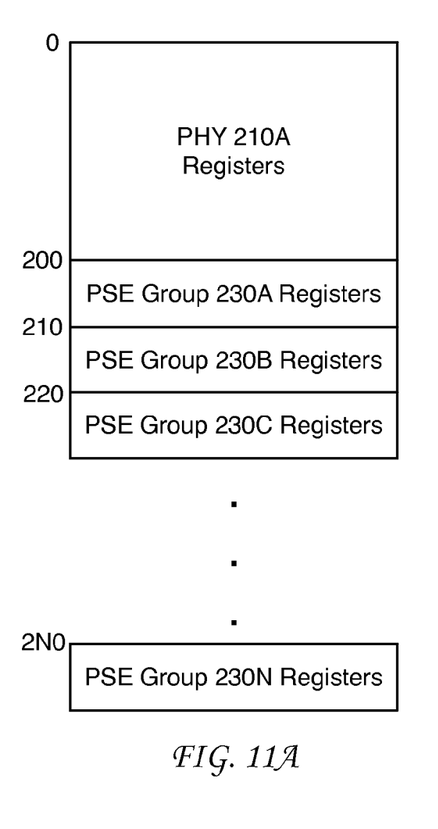
Figure 11B:
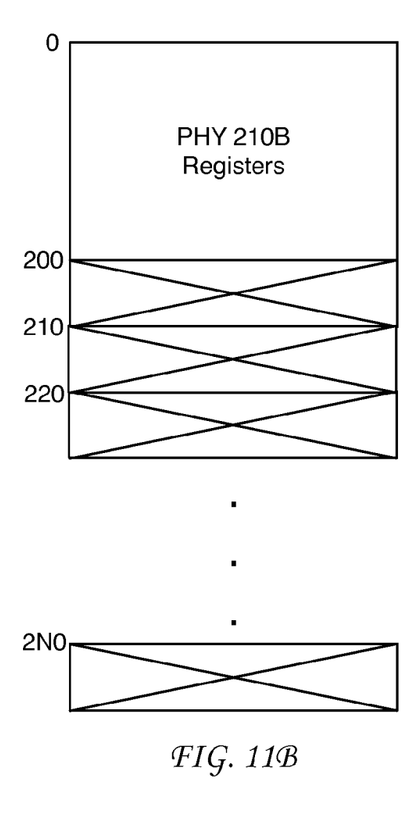
Figure 11C:
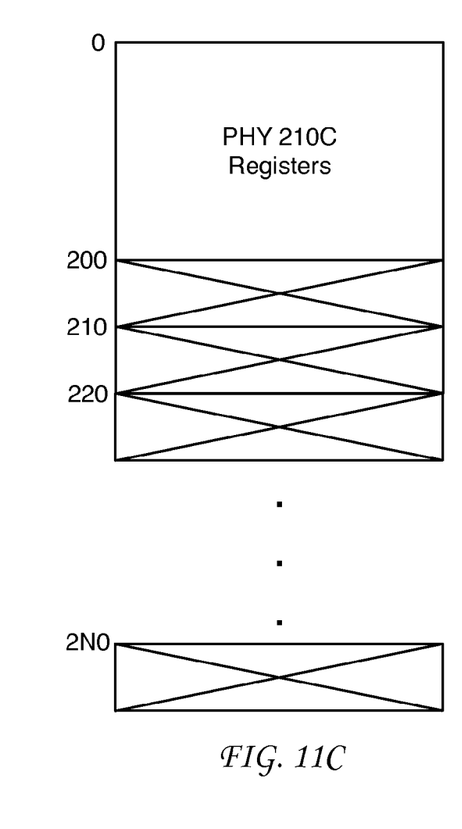

Accordingly, in another embodiment such as that illustrated in FIGS. 11A-11C, master and slave devices are implemented using identical chips. In this embodiment, the register space of the slave PHYs (e.g., 210B and 210C) would include an extended register space that was left unused.

As has been described, a system and method has been provided for mirroring PoE registers in PHYs over a single isolation boundary. This single isolation boundary enables communication between a master PHY and the PSE controllers in a plurality of PSE controller groups. This enables the ability for software to address all aspects of the physical layer on a per-port or "slice" basis while using a single isolation boundary, and can be applied to single or multi-port PDs.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system, comprising:
    a switch;
    a plurality of physical layer devices coupled to said switch, each of said plurality of physical layer devices including one or more Ethernet transceivers such that said plurality of physical layer devices combine to include a plurality of Ethernet transceivers, wherein one of said plurality of physical layer devices is configured as a master device;
    a plurality of power source equipment controllers, each of said power source equipment controllers being associated with a respective subset of said plurality of Ethernet transceivers; and
    an isolation device that creates an isolation boundary between said plurality of physical layer devices and said plurality of power source equipment controllers, wherein all communication destined for said plurality of power source equipment controllers is sent by said master device via said isolation device.

2. The system of claim 1, wherein one of said power source equipment controllers is configured as a master device.

3. The system of claim 1, wherein all of said power source equipment controllers are configured as slave devices.

4. The system of claim 1, further comprising a microcontroller that enables communication between said master device and said plurality of power source equipment controllers.

5. The system of claim 1, wherein said master device has a copy of power source equipment controller registers in each of said plurality of power source equipment controllers.

6. The system of claim 5, wherein said physical layer devices that are not configured as said master device do not have a copy of power source equipment controller registers for non-associated power source equipment controllers.

7. The system of claim 6, wherein said physical layer devices include logic that determines whether a register address included in a message, corresponds to a valid power source equipment controller register that is kept by the physical layer device that receives said message.

8. The system of claim 7, wherein if a receiving physical layer device determines that said register address included in said message does not correspond to a valid power source equipment controller register kept by said receiving physical layer device, then said receiving physical layer device ignores said message.

9. The system of claim 7, wherein if a receiving physical layer device determines that said register address included in said message does correspond to a valid power source equipment controller register kept by said receiving physical layer device, then said receiving physical layer device updates said valid power source equipment controller register using content of said message.

10. The system of claim 1, further comprising a bus that connects said plurality of physical layer devices, wherein physical layer devices that are not configured as said master device ignore all power over Ethernet related messages on said bus.

11. A power over Ethernet method, comprising:
    receiving, in a first physical layer device that is designated as a master device, a first message from a second physical layer device, wherein said first message relates to a power source equipment controller that is responsible for providing power to an Ethernet transceiver in said second physical layer device; and
    transmitting a second message based on said first message, from said first physical layer device to said power source equipment controller via an isolation device, wherein said isolation device creates a single isolation boundary between a plurality of physical layer devices and a plurality of power source equipment controllers.

12. The method of claim 11, wherein all communication destined for said plurality of power source equipment controllers from said plurality of physical layer devices is sent by said master device via said isolation device.

13. The method of claim 11, further comprising updating, in said first physical layer device, a power over Ethernet register associated with said Ethernet transceiver in said second physical layer device.

14. The method of claim 11, further comprising storing, in said first physical layer device, power over Ethernet registers associated with all Ethernet transceivers governed by said plurality of power source equipment controllers.

15. The method of claim 11, wherein said receiving comprises receiving on a bus that connects said plurality of physical layer devices, wherein a physical layer device that is not designated as a master device ignores message traffic on said bus that relates to Ethernet transceivers governed by said plurality of power source equipment controllers.

16. A power over Ethernet method, comprising:
  receiving, in a master physical layer device, a first message from a host, said master physical layer device storing power over Ethernet registers for power source equipment controllers associated with said master physical layer device and a plurality of slave physical layer devices, said plurality of slave physical layer devices not storing power over Ethernet registers;
  determining, in said master physical layer device, whether a register address in said first message is for one of said power over Ethernet registers;
  updating a power over Ethernet register in said master physical layer device if said register address is for one of said power over Ethernet registers; and
  transmitting a second message based on said first message, from said master physical layer device to a power source equipment controller via an isolation device, wherein said isolation device creates a single isolation boundary between a plurality of physical layer devices and a plurality of power source equipment controllers.

17. The method of claim 16, wherein said receiving comprises receiving via a management data input/output bus.

18. The method of claim 16, wherein said updating comprises updating a power over Ethernet register associated with a slave physical layer device.

19. The method of claim 16, further comprising determining, in said master physical layer device, whether said first message relates to a register for said master physical layer device, if said register address in said first message does not relate to any of said power over Ethernet registers.

20. The method of claim 16, wherein all communication destined for said plurality of power source equipment controllers is sent by said master physical layer device via said isolation device.

* * * * *